Sept. 6, 1927. 1,641,496
A. M. KUHL
FLOWER BOX AND FISH BOWL
Filed Oct. 28, 1925
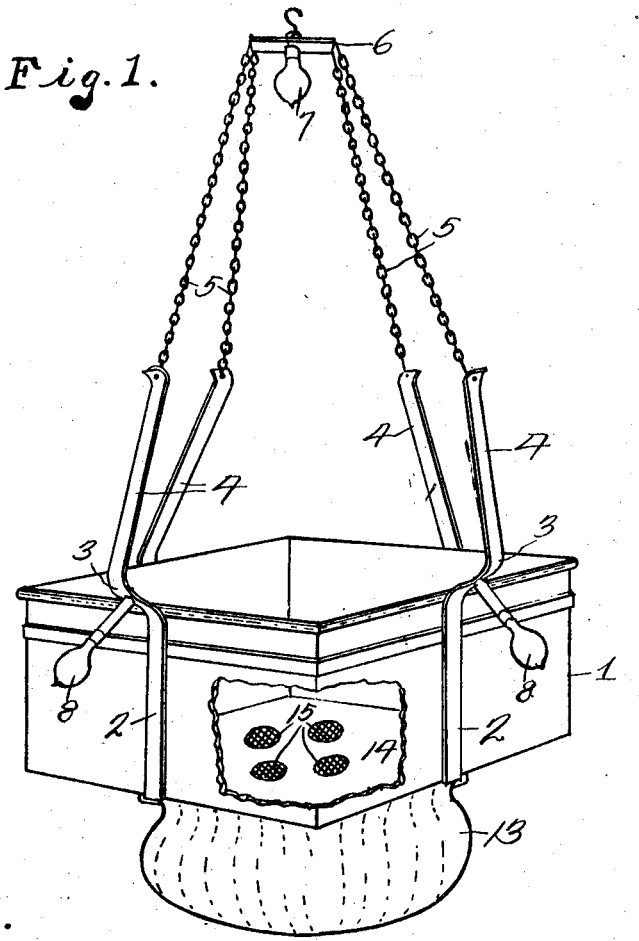
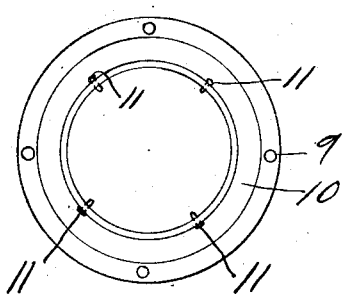
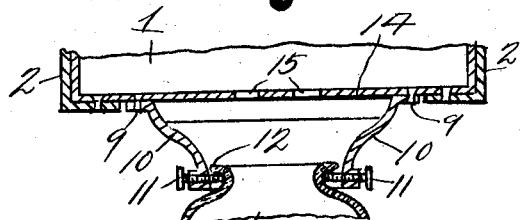
INVENTOR.
Alphons M. Kuhl
BY
ATTORNEY.

Patented Sept. 6, 1927.

1,641,496

UNITED STATES PATENT OFFICE.

ALPHONS M. KUHL, OF OMAHA, NEBRASKA.

FLOWER BOX AND FISH BOWL.

Application filed October 28, 1925. Serial No. 65,377.

The invention relates to flower boxes and fish bowls, and has for its object to provide a flower box which may be suspended from an overhead support for the reception of flower pots, and the underside of the box provided with an annular member adapted to receive and hold the upper end of a fish bowl, which is formed from transparent material, for instance glass.

A further object is to provide the bottom of the flower box with screened apertures through which water may pass as well as air, thereby adding oxygen to the water within the bowl, the bowl also receiving the surplus water.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of the flower box and fish bowl.

Figure 2 is a vertical transverse sectional view through a lower portion of the flower box, the bowl supporting ring and a portion of the bowl.

Figure 3 is a bottom plan view of the bowl ring.

Referring to the drawing, the numeral 1 designates a rectangular shaped flower box for the reception of a flower pot, the opposite sides of which are provided with upwardly extending arms 2, which adjacent their upper ends are outwardly curved at 3 and then terminate in inwardly converging arms 4 to the upper ends of which are connected supporting chains 5. The supporting chains converge upwardly and inwardly and are connected to a plate 6, which may be attached to a wall in any suitable manner, however the plate 6 forms a support for an electric lamp 7, and the curved portions 3 of the arms 2 have attached thereto electric lamps 8, which extend downwardly and outwardly, therefore it will be seen that the flower box is supported by the chains 5, and the chains and arms 4 form an ornamental structure for the flower box.

Secured to the under side of the flower box 1 by means of rivets 9 is an annular bowl holder 10, which bowl holder is provided with set screws 11, which engage under the flange 12 of the fish bowl 13, and securely attach the fish bowl to the flower box and supports the fish bowl, so that persons passing under the same can observe fish within the bowl, and at the same time the bowl is supported in a position where danger of the same being knocked over or broken is obviated. The bottom 14 of the box 1 is provided with screened openings 15, through which water will drain from the flower box, and at the same time sufficient air will pass to the water within the bowl to replenish the oxygen therein as it is consumed, thereby insuring a constant supply of air to the fish through the medium of the water.

From the above it will be seen that a combined flower box and fish bowl is provided which is simple in construction, may be suspended from an overhead support, and one which presents an ornamental appearance, especially when flowers are in the box, and gold fish in the bowl.

The invention having been set forth what is claimed as new and useful is:—

A combined flower box and fish bowl comprising a flower pot receptacle, screened openings in the bottom of said receptacle, a transparent bowl beneath the receptacle, an annular member carried by the bottom of the receptacle and means carried by said annular member for receiving and holding the upper end of the bowl in spaced relation to the annular member, thereby forming an annular air passage.

In testimony whereof I hereunto affix my signature.

ALPHONS M. KUHL.